2,746,985
PROCESS OF RECOVERY OF OXYGENATED HYDROCARBONS FROM HYDROCARBON SYNTHESIS

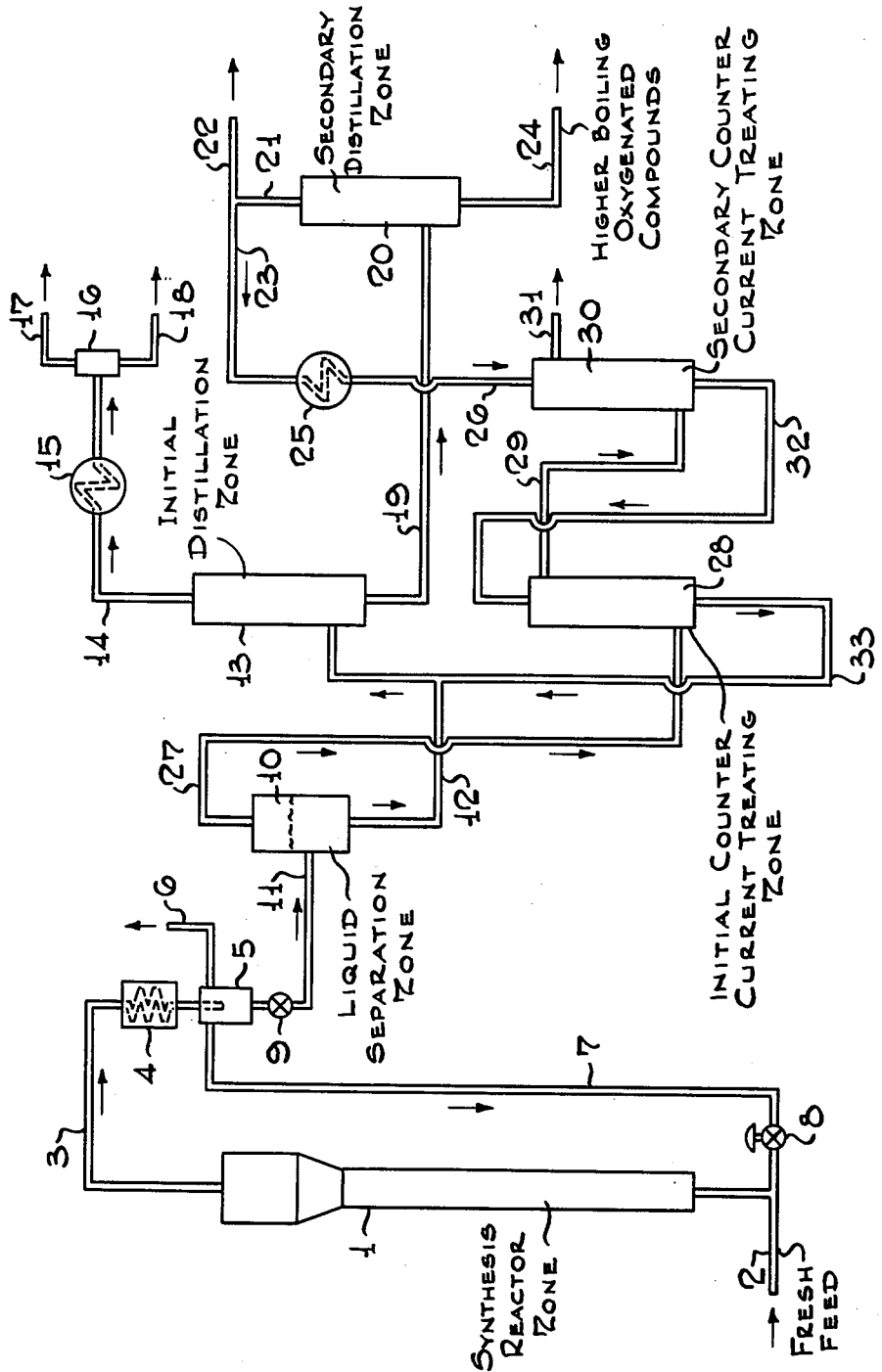

Clinton H. Holder, Cranford, N. J., assignor to Esso Research and Engineering Company, a corporation of Delaware Application July 12, 1946, Serial No. 682,977

4 Claims. (Cl. 260—450)

The present invention is concerned with an improved hydrocarbon synthesis process. It more particularly relates to an improved hydrocarbon synthesis operation wherein the respective streams are handled in a manner to segregate and recover oxygenated compounds produced in the reaction. By operating in accordance with the present process higher yields of improved products are secured. In accordance with the present invention, the reactant gases removed overhead from the synthesis reaction zone are cooled to condense the same. The condensate is passed to a separation zone wherein an oil layer and an aqueous layer segregate. The aqueous layer is distilled in an initial distillation zone under conditions to remove overhead an alcohol rich stream. The bottoms from the initial distillation zone are passed to a secondary distillation zone and distilled under conditions to remove overhead a stream comprising essentially water and to remove as bottoms, a stream comprising essentially oxygenated compounds. This aqueous overhead stream from the secondary distillation zone is used to countercurrently treat the oil stream segregated in the separation zone. By operating in accordance with the present process, unexpected desirable results are secured and improved yields of high quality products are secured.

It is well known in the art to conduct hydrocarbon synthesis reactions by contacting hydrogen and oxides of carbon with catalysts under various temperature and pressure conditions. The catalysts employed are usually selected from the iron group metals, as, for example, iron, cobalt and nickel. They are utilized either alone or on suitable carriers such as kieselguhr, diatomaceous earth, pumice, synthetic gels, silica and alumina. Promotors such as the carbonates or halides of the alkali metals, particularly potassium, are used with the iron group metals. These catalysts are employed either in fixed bed or in fluid catalyst operations.

The temperatures employed vary widely, as, for example, in the range from about 400° F. to about 800° F. and are generally in the range from about 500° F. to about 700° F. The particular temperature employed will depend upon, among other factors, the type of non-gaseous hydrocarbon product desired, the character and the activity of the particular catalyst utilized, the throughput and composition of the synthesis gases and upon the reaction pressure. For instance, when utilizing a mixture of feed gases comprising carbon monoxide and hydrogen in the ratio of one mol of carbon monoxide per two mols of hydrogen at pressures in the range atmospheric to 100 lbs. per square inch, and in the presence of a cobalt catalyst, the reaction temperature is generally in the range from about 340° F. to about 500° F. On the other hand, if similar feed gases are utilized employing 300 lb. per square inch pressure and an iron catalyst, the temperature is generally in the range from about 500° to about 700° F.

The pressures likewise vary considerably and are a function of other operative conditions such as catalysts employed, activity of the catalyst, character of the feed gases and the temperatures utilized. Pressures in the range from 1 to 100 atmospheres have been suggested. When utilizing an iron type catalyst, it has been proposed to use pressures in the range from about 25 to 750 lbs. gauge although preferred pressures have been in the range below about 300 lbs. gauge. When employing cobalt catalysts, the pressures generally employed have been somewhat lower, generally around atmospheric pressure, and seldom in excess of 100 lbs. per square inch gauge. The character of the feed gases depends somewhat upon the temperatures and pressures and upon the catalysts employed. For example, when employing a cobalt type catalyst, it is preferred to use one mol of carbon monoxide to two mols of hydrogen, while, when an iron catalyst is utilized, equal mols of hydrogen and carbon monoxide in the feed synthesis gases are desirable. The volumes of feed gases utilized per volume of catalysts likewise vary considerably. In general, it is preferred to use from about 500 to 2000 volumes of feed gases per volume of catalyst per hour. Also, it is frequently desirable to recycle the synthesis tail gas to the reactor. The recycle gas to fresh feed ratio may be from 0.5 to 7.5 of recycle gas to one of fresh feed.

Operations such as described are generally conducted under conditions to secure the maximum yield of hydrocarbon constituents containing four or more carbon atoms in the molecule. However, under the conditions of the operation, various side reactions occur which result in the production of valuable oxygenated compounds. In accordance with my invention, I propose to recover and segregate these valuable oxygenated compounds from the hydrocarbon constituents in a manner to secure improved yields of the various reaction products.

The process of my invention may be readily understood by reference to the attached drawing illustrating one modification of the same. Feed gases comprising oxides of carbon and hydrogen are introduced into reaction zone 1 by means of feed line 2. Temperature and pressure conditions are maintained in reaction zone 1 to secure the desired reaction products. For the purpose of illustration it is assumed that the catalyst comprises an iron type catalyst and that the temperature in the reaction zone is maintained in the range from about 550° F. to about 650° F. and that the pressure is maintained in the range from about 200 to about 300 pounds per square inch. After a sufficient time of contact, the reaction gases are removed overhead from reaction zone 1 by means of line 3, passed through condensing zone 4 and introduced into gas separation zone 5. Uncondensed gases may be withdrawn from the system by means of line 6. However, at least a portion of the uncondensed gases are preferably recycled to reaction zone 1 by means of recycle line 7 and controlled by means of control valve 8.

The condensate is withdrawn from gas separation zone 5 through valve 9 and passed into a liquid separation zone 10 by means of line 11. Segregation between the oil phase and the aqueous phase occurs in liquid separation zone 10. The aqueous phase is withdrawn from the bottom of liquid separation zone 10 by means of line 12 and passed into initial distillation zone 13. Temperature and pressure conditions in initial distillation zone 13 are controlled so as to remove overhead, by means of line 14, an alcohol rich phase. This alcohol rich overhead stream is cooled and condensed in condensing zone 15 and passed into separation zone 16. Uncondensed constituents are removed from separation zone 16 by means of line 17 while the condensed stream comprising essentially alcohols is removed from the bottom of separation zone 16 by means of line 18. These streams removed by means of lines 17 and 18 may be further treated or handled in any manner desirable in order to segregate fractions of the desired specification.

The bottom stream from initial distillation zone 13 is removed by means of line 19 and introduced into secondary distillation zone 20. Temperature and pressure conditions are maintained in secondary distillation zone 20 so as to remove overhead, by means of line 21, a phase rich in water. The acqueous phase may be withdrawn from the system by means of line 22, but is preferably recycled by means of line 23 and handled in a manner as hereafter described. Higher boiling oxygenated compounds are removed as a bottoms stream from secondary distillation zone 20 by means of line 24 and handled in any manner desirable. This stream may be further treated or distilled in a manner to segregate various factions having the desired specifications.

In accordance with the preferred modification of my invention, the oil phase segregated in liquid separation zone 10 is removed by means of line 27 and introduced into the bottom of initial countercurrent treating zone 28. The oil phase flows upwardly through zone 28 and is withdrawn by means of line 29 and introduced into the bottom of secondary countercurrent treating zone 30. The oil phase flows upwardly through countercurrent treating zone 30 and countercurrently contacts the downflowing aqueous phase which is secured by condensing at least a portion of the overhead from zone 20 in condensing zone 25. This aqueous condensed phase is introduced into the top of countercurrent treating zone 30 by means of line 26. The treated oil phase is withdrawn by means of line 31 and is substantially completely free of oxygenated compounds. The aqueous phase is withdrawn from the bottom of secondary countercurrent treating zone 30 by means of line 32 and introduced into the top of initial countercurrent treating zone 28. This aqueous phase is withdrawn from the bottom of initial countercurrent treating zone 28 by means of line 33 and recycled to initial distillation zone 13, by combining this stream with the liquid stream passing from liquid separation zone 10 to initial distillation zone 13 by means of line 12.

The process of the present invention may be varied within the scope described. The invention essentially comprises condensing the reactant gases removed overhead from the reaction zone and segregating an oil phase and an aqueous phase. The aqueous phase is distilled in an initial distillation zone to remove overhead a phase comprising essentially alcohols. The bottom stream from the initial distillation zone is distilled in a manner to remove overhead a stream comprising essentially water, and to segregate a bottom stream comprising essentially higher boiling oxygenated compounds. The overhead stream from the secondary distillation zone is used to countercurrently treat the oil phase and is recycled to the initial distillation zone.

By operating in the described manner, unexpected desirable results are secured. The oxygenated compounds produced during hydrocarbon synthesis are distributed between the oil and water phases in an amount which is a function of the relative volume of product oil and water and the molecular weight and type of the oxygenated compounds produced. The latter factor determines the relative solubility of the oxygenated compounds in the two phases. In normal operations the ratio of water produced to oil produced may vary over the range from about 0.8 to 3.0 volumes of water per volume of oil, depending upon the operating conditions and catalyst employed during the synthesis operation. Accordingly, there is a wide variation in the proportion of the total oxygenated compounds existing in the water phase and this extends over the range from about 35 to 80%. It is obvious, therefore, that under certain conditions treatment of only the water phase for recovery of oxygenated products may result in large losses of these valuable products. Accordingly, it is highly desirable to contact the oil with the water phase after substantially reducing its content of oxygenated product. In order to most effectively transfer the oxygenated products from the oil to the water phase, the operation is carried out countercurrently.

Another advantage in removing the oxygenated compounds from the oil phase lies in the subsequent disposition of the oil. Since the oxygenated products in the oil phase are generally of higher molecular weight than those normally present in the water phase, it is obvious that these will be present through the entire boiling range of the gasoline and therefore could not be removed by fractionation. By removing these oxygenated compounds by the technique herein described, subsequent treating by a method such as bauxite treating, in order to make a suitable gasoline, may be eliminated or its severity reduced so that treating losses will be smaller.

Temperatures and pressures may vary considerably. It is preferred that the temperature in condensing zone 4 be maintained in the range from about 40 to 100° F., preferably in the range from 50 to 60° F. The preferred pressure in zone 4 will be equal to the operating pressure in the synthesis reactor zone 1. The temperatures and pressures in the initial distillation zone and in the secondary distillation zone likewise may vary appreciably. In general, it is preferred that a pressure of about 1 atmosphere be employed in the initial and secondary distillation zones although in certain cases it may be desirable to operate these zones at super-atmospheric pressure, in an amount up to the pressure existing in the synthesis zone 1. The temperature at the top of the initial distillation zone 13 should be in the range from about 208° F. to about 212° F., preferably in the range from about 210° F. to about 212° F. The temperatures at the top of the secondary distillation zone 20 should be in the range from about 212° F. to about 220° F., preferably in the range from about 213° F. to about 216° F.

It is preferred that the overhead stream removed from the secondary distillation zone be condensed and cooled to a temperature of about 100° F. The amount of aqueous phase used to countercurrently treat the oil streams in the countercurrent treating zones is preferably in the range of about 3 volumes to about 50 volumes of water per volume of oil being treated. In general, it is desired that these units be run at a temperature in the range from about 50° F. to 150° F. and at a pressure equal to about atmospheric pressure. In order to illustrate my invention the following example is given:

EXAMPLE I

A sample of oil product was extracted in 10 successive treatments, each treatment consisting of 2 vols. of distilled water per volume of oil. The following data illustrate the extent to which the oxygenated compounds were removed by the batch treatment with water.

*Extraction of oxygenated compounds from oil phase by means of H₂O*

| Dump | Total Wash Water, Vol./Vol. of Original Oil | Oxygenated Compounds, Content of Oil, Wt. Percent | Percent Total Oxygenated Compounds Removed | Oxygenated Compounds Removed, cc./m.³ of Converted Feed |
|---|---|---|---|---|
| 0 | 0 | 3.8 | 0 | 0 |
| 1 | 2.0 | 2.0 | 47 | 5.1 |
| 2 | 3.9 | 1.5 | 61 | 6.8 |
| 5 | 9.6 | 0.6 | 84 | 9.6 |
| 10 | 18.9 | 0.4 | 90 | 11.5 |

The data show that after 5 dumps 84% of the oxygenated materials originally present in the oil phase had been removed.

The production of oxygenated compounds during the hydrocarbon synthesis operation is affected greatly by both operating conditions and the type of catalyst employed. For example, the hydrogen content of the total feed gas influences the type of oxygenated compounds produced. When using high concentrations of hydrogen the yields of alcohols are increased while at the same time lower yields of aldehydes and ketones are obtained. Likewise, increased operating pressure promotes the formation of oxygenated compounds. Temperature, recycle ratio, conversion and hydrogen to carbon monoxide fresh feed ratio are also factors in determining the yield of oxygenated compounds. As mentioned, these variables affect not only the total yield and type of oxygenated compounds, but also the molecular weight of the oxygenated product and, therefore, the distribution of these compounds between the oil and water phases. In view of the above, it will be appreciated that the following example illustrating my invention merely indicates one possible set of results. It is obvious that under different conditions, as indicated above, quite widely different results might be obtained.

EXAMPLE II

A hydrocarbon synthesis reaction was conducted at a temperature of 625° F. and at a pressure of 300 pounds per square inch. About 750 volumes of synthesis gas per volume of catalyst per hour was used. The recycle ratio was approximately 2 volumes of recycle gas per volume of fresh feed. The catalyst employed was an iron catalyst promoted with 1½% of potassium carbonate. The overhead reacting gas stream was cooled to a temperature of about 60° F. The yield of hydrocarbons comprising 4 carbon atoms in the molecule and higher boiling constituents, including the oxygenated compounds therein, was 175 cc. per cubic meter of hydrogen and carbon monoxide converted. The yield of the aqueous phase was about 235 cc. per cubic meter of hydrogen and carbon monoxide converted. The temperature in the initial distillation zone was maintained to remove overhead constituents whose aqueous azeotropes boiled below about 212° F. The overhead stream from the initial distillation zone comprised about 16½ volume per cent of the aqueous phase and contained oxygenated compounds in about 90% concentration. The oxygenated compounds comprised mainly alcohols having 2, 3, 4 and 5 carbon atoms in the molecule, together with some low boiling aldehydes and ketones. Specific alcohols are, for example, ethyl alcohol, propyl alcohol, butyl alcohol and amyl alcohol. The acids were in the bottoms fraction together with esters and other higher boiling alcohols, aldehydes and ketones. These higher boiling oxygenated compounds in aqueous solution pass to the secondary distillation zone which was maintained at a temperature just sufficient to remove water overhead. It is desirable that both the initial and the secondary distillation zones have an efficiency of about 20 to 40 plates and that the reflux ratio be in the range of about 5 to 10 volumes of reflux per volume of fresh feed.

The oxygen content of the oil initially separated from the water phase contained about 6% by weight of oxygen. This represents about 28 cc. per cubic meter of converted hydrogen and carbon monoxide consumed, calculated as 5 carbon atom compounds from the hydroxyl, carbonyl, carboxyl and ester oxygen contents.

In accordance with my process by treating the oil stream with about 8 volumes of water per volume of oil at least 75% of these oxygenated compounds are removed from the oil and their recovery effected. Thus, with an oil yield of 175 cc. per cubic meter of hydrogen and carbon monoxide consumed, the quantity of oxygenated product removed from the oil stream is about 21 cc. per cubic meter of hydrogen and carbon monoxide consumed. The oxygenated material present in the water layer is about 35 cc. per cubic meter of hydrogen and carbon monoxide consumed. Thus, the total production of oxygenated compounds is about 56 cc. per cubic meter of hydrogen and carbon monoxide consumed in the synthesis reaction. Thus, by scrubbing the oil phase an increase of 60% in the recovery of oxygenated compounds was secured.

As an illustration of the molecular weight and molecular type of the oxygenated products formed incidental to the hydrocarbon synthesis process, the following detailed analysis of the overhead fraction leaving the initial distillization zone is presented below:

*Analysis of oxygenated product from initial distillation zone*

| Type of Compound | Wt. Percent (Dry Basis) |
|---|---|
| Acetaldehyde | 1.0 |
| Acetone | 2.0 |
| Methanol | 0.9 |
| Methyl Ethyl Ketone | 1.6 |
| Ethanol | 37.0 |
| Isopropanol | 3.6 |
| n-Propanol | 19.2 |
| Sec.-Butanol | 1.7 |
| n-Butanol | 15.5 |
| Amyl + Higher Alcohols | 10.6 |
| Esters | 1.0 |
| Acids (Mainly Acetic) | 5.0 |
| Unknown | 0.9 |
| Total | 100.0 |

It will be noted that ethyl alcohol is the predominant compound in the above group. The presence of alcohols up to and including the amyl alcohols in the overhead fraction from the initial distillation zone operating at 212° F. is the result of their coming over in the form of aqueous azeotropes which boil considerably below the boiling point of the pure compounds.

The oxygenated compounds removed from the second distillation zone are as follows:

*Analysis of oxygenated product from secondary distillation zone*

| Type of Oxygenated Compound | Volume Percent of Total |
|---|---|
| Alcohols | 30 |
| Acids | 20 |
| Aldehydes and Ketones | 45 |
| Esters | 5 |

The oxygenated products removed from the secondary distillation zone are much higher boiling than those removed from the initial distillation zone and their boiling range is approximately 220° F. to 500° F.

The process of my invention is not to be limited by any theory as to mode of operation but only in and by the following claims in which it is desired to claim all novelty insofar as the prior art permits.

What I claim is:

1. In a process for separating and recovering neutral and acid oxygenated hydrocarbon products present in a synthesis vapor mixture of hydrocarbons and water formed by reaction of hydrogen with carbon monoxide, the improvement which comprises cooling said synthesis vapor mixture at 40° F. to 100° F. to condense therefrom an oil phase condensate containing oxygenated hydrocarbons dissolved in hydrocarbons and also an aqueous phase condensate containing mainly alcohols higher boiling than methanol dissolved in said water, removing uncondensed vapors from said condensates, separating and removing the oil phase condensate from the aqueous phase condensate, passing the separated aqueous phase condensate into an initial distillation zone wherein a light fraction of $C_1$ to $C_5$ oxygenated hydrocarbons that distill with water at temperatures within the range of about 40° F. to 212° F. are separated from a heavier aqueous fraction containing acid products of the reaction dissolved in said aqueous phase condensate, passing said heavier fraction substantially free of alcohols having up through 5 carbon atoms in the molecule to a secondary distillation zone wherein an aqueous distillation fraction is distilled from a remaining residual fraction containing higher boiling oxygenated hydrocarbons, contacting the separated oil phase condensate, removed from said aqueous phase condensate, with said aqueous distillation fraction from said secondary distillation zone to extract oxygenated hydrocarbons therefrom and recovering neutral oxygenated hydrocarbons that are distilled from the initial distillation zone, neutral oxygenated hydrocarbons extracted from the oil phase, and acids concentrated in the residual fraction of the secondary distillation zone.

2. An improved process according to claim 1 in which said aqueous distillation fraction from said secondary zone after contacting said oil phase is returned to said initial distillation zone.

3. An improved process according to claim 1 in which the temperature in said initial distillation zone is in the range from about 208° F. to 212° F. and the temperature in said secondary distillation zone is from about 212° F. to 220° F. and in which the pressures maintained in the distillation zones are approximately atmospheric pressure and in which said aqueous fraction from said secondary distillation zone after contacting said oil phase is returned to said initial distillation zone.

4. A process for treating the product of hydrogenation of oxides of carbon wherein such product comprises a mixture of hydrocarbons, water-soluble and oil-soluble oxygenated organic compounds, said oxygenated compounds comprising organic acids and non-acidic organic compounds, which comprises cooling said product to effect substantial condensation of normally liquid components contained therein to form an oil product liquid phase and a water product liquid phase, separating said phases, separately subjecting said oil product liquid phase to extraction with an aqueous solvent for oxygenated organic compounds contained in said oil phase to produce a raffinate comprising hydrocarbons and an extract comprising water-soluble oxygenated organic compounds, said aqueous solvent comprising essentially water free of $C_1$ through $C_5$ alcohols, combining said extract with said water product liquid phase to produce a mixture comprising organic acids and non-acidic compounds, separating acids from non-acidic components contained in said mixture by distilling the non-acidic components with water up to a temperature of about, but not above 212° F. to thereby concentrate the acids in the residual part of the mixture, and further concentrating the acids in said residual part of the mixture by separating water therefrom and using the separated water as said aqueous solvent in the extraction of oxygenated organic compounds from the oil phase.

References Cited in the file of this patent

UNITED STATES PATENTS

| | | |
|---|---|---|
| Re. 23,433 | Marschner | Oct. 30, 1945 |
| 1,838,547 | Haslam et al. | Dec. 29, 1931 |
| 1,870,816 | Lewis | Aug. 9, 1932 |
| 2,075,295 | Loder | Mar. 30, 1937 |
| 2,274,750 | Soenksen et al. | Mar. 3, 1942 |
| 2,348,191 | Camelford | May 9, 1944 |
| 2,417,164 | Huber | Mar. 11, 1947 |
| 2,472,219 | Lyons | June 7, 1949 |
| 2,482,284 | Michael et al. | Sept. 20, 1949 |

OTHER REFERENCES

Gatterman: Practical Methods of Organic Chemistry, 3rd ed., pub. by McMillan (1923), N. Y., pages 43–49.

Fischer: Conversion of Coal Into Oils, Ernest Benn, Ltd., London (1925), pages 241–246.